United States Patent
Kawano

(10) Patent No.: US 11,377,718 B2
(45) Date of Patent: Jul. 5, 2022

(54) STEEL FOR MOLD

(71) Applicant: DAIDO STEEL CO., LTD., Nagoya (JP)

(72) Inventor: Masamichi Kawano, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 23 days.

(21) Appl. No.: 16/598,733

(22) Filed: Oct. 10, 2019

(65) Prior Publication Data

US 2020/0115783 A1 Apr. 16, 2020

(30) Foreign Application Priority Data

Oct. 12, 2018 (JP) .............................. JP2018-193634
Aug. 27, 2019 (JP) .............................. JP2019-155011

(51) Int. Cl.
*C22C 38/42* (2006.01)
*C22C 38/44* (2006.01)
*C22C 38/52* (2006.01)
*B29C 45/26* (2006.01)

(52) U.S. Cl.
CPC .......... *C22C 38/42* (2013.01); *B29C 45/2602* (2013.01); *C22C 38/44* (2013.01); *C22C 38/52* (2013.01)

(58) Field of Classification Search
CPC ....... C22C 38/001; C22C 38/02; C22C 38/04; C22C 38/06; C22C 38/18; C22C 38/46
See application file for complete search history.

(56) References Cited

U.S. PATENT DOCUMENTS

| | | |
|---|---|---|
| 2002/0044880 A1 | 4/2002 | Nakatsu et al. |
| 2006/0285992 A1 | 12/2006 | Ibuki et al. |
| 2007/0110610 A1* | 5/2007 | Kurata .................... C21D 8/021 420/105 |
| 2008/0240970 A1 | 10/2008 | Eto et al. |
| 2016/0010189 A1 | 1/2016 | Sugano et al. |

FOREIGN PATENT DOCUMENTS

| | | |
|---|---|---|
| EP | 2 270 246 A1 | 1/2011 |
| EP | 2 660 348 A1 | 11/2013 |
| EP | 2 722 406 A1 | 4/2014 |
| EP | 3 050 649 A1 | 8/2016 |
| EP | 3 216 890 A2 | 9/2017 |
| JP | 11350031 A * | 12/1999 |
| JP | 2000-297353 A | 10/2000 |
| JP | 2004-091840 A | 3/2004 |
| JP | 2010-024510 A | 2/2010 |

(Continued)

OTHER PUBLICATIONS

English Translation of Tables from JPH11-350031A (Year: 2022).*

(Continued)

*Primary Examiner* — Adam Krupicka
(74) *Attorney, Agent, or Firm* — McGinn I.P. Law Group, PLLC.

(57) ABSTRACT

The present invention relates to a steel for a mold, having a composition containing, in mass %, $0.045 \leq C \leq 0.090$, $0.01 \leq Si \leq 0.50$, $0.10 \leq Mn \leq 0.60$, $0.80 \leq Ni \leq 1.10$, $6.60 \leq Cr \leq 8.60$, $0.01 \leq Mo \leq 0.70$, $0.001 \leq V \leq 0.200$, $0.007 \leq Al \leq 0.150$, and $0.0002 \leq N \leq 0.0500$, with the balance being Fe and unavoidable impurities.

32 Claims, 2 Drawing Sheets

(56) References Cited

FOREIGN PATENT DOCUMENTS

| | | | |
|---|---|---|---|
| JP | 2013-127109 A | 6/2013 |
| JP | 2013-177669 A | 9/2013 |
| TW | 200643190 A | 12/2006 |
| TW | 200900513 A | 1/2009 |
| TW | 201416462 A | 5/2014 |
| TW | 201441387 A | 11/2014 |

OTHER PUBLICATIONS

Taiwanese Office Action, dated Apr. 23, 2020, in Taiwanese Application No. 108136975 and English Translation thereof.
Korean Office Action, dated Feb. 1, 2021, in Korean Application No. 10-2019-0126369 and English Translation thereof.
Extended European Search Report dated Mar. 16, 2020 for European Patent Application No. 19202539.3-1108.
Chinese Office Action, dated Mar. 1, 2021, in Chinese Application No. 201910968069.6 and English Translation thereof.
Chinese Office Action, dated Aug. 12, 2021, in Chinese Patent Application No. 201910968069.6 and English Translation thereof.
Chinese Office Action dated Feb. 10, 2022, in corresponding Chinese Patent Application No. 201910968069.6, with an English translation thereof.

* cited by examiner

STEEL FOR MOLD

TECHNICAL FIELD

The present invention relates to a steel for a mold suitable for use in a mold used in injection molding of plastics and the like, and a mold.

BACKGROUND

A mold (including parts constituting a part of the mold) for injection molding of plastic products is manufactured through steps of melting, refining, homogenization heat treatment, hot working, normalizing, annealing (tempering), quenching-tempering, cutting processing, and mirror polishing. A material for the mold is required to have various properties. In particular, a material used in a mold for injection molding of plastic products is required to have high mirror polishability. Furthermore, corrosion resistance to an extent that a mold does not rust even though being left and such a high impact value that a mold is difficult to be broken during use are also required.

(Regarding Mirror Polishability)

A mold takes a role of transferring surface shape and properties (surface roughness and patterns) thereof to a product. Above all, the surface must be smoothly polished in the case where a product is required to have a smooth surface. This is called mirror polishing.

One of factors deteriorating mirror polishability is "pinholes". Pinholes are small holes or scratches generated on the surface of a polished mold. In the case where the mold having a pinhole generated thereon is directly used, the portion of the pinhole is transferred to the surface of a product to deteriorate its surface quality, losing commercial value. Therefore, pinholes should be avoided from being generated in mirror polishing.

There are two types of pinholes, that is, those formed by stuck polishing abrasives (caused by polishing) and those formed when foreign substances inside a steel material is dropped out (caused by a steel material). A steel for a mold containing small amount of foreign substances (carbides, oxides and nitrides) is required in order to decrease pinholes caused by a steel material. Various measures for decreasing such foreign substances are made in refining and casting of a steel material. Furthermore, in the case where a mold has a low hardness, pinholes are easy to be generated. Therefore, it is also essential to adjust chemical components (particularly C) that can secure a certain level or more of hardness. However, in the case where the C content is too large, the amount of carbides that serve as foreign substances is also increased. Therefore, it is difficult to balance with hardness.

(Regarding Corrosion Resistance)

A period until beginning to use a mirror polished mold or a period that the mold is left, such as a suspension period of manufacturing may generate rust on a mold surface. In the case where the mold having rust generated thereon is directly used, the rusted part is transferred to the surface of a product to deteriorate its surface quality, losing commercial value. Therefore, rusted mold is required to be re-polished, but cost and the number of steps required in the re-polishing are enormous. A mold is required to have a corrosion resistance to an extent that it does not rust even though being left.

Corrosion resistance of a mold is almost determined by the Cr content. A low-Cr steel having the Cr content of 0.2 to 3% is often used in a mold for injection molding. The low-Cr steel has a very low corrosion resistance and therefore, a mold made of such a steel is easy to rust when being left. Therefore, a 5% Cr-die steel (SKD61, etc.) is sometimes used, but the 5% Cr steel does not have a sufficient corrosion resistance in a high temperature and high humidity environment. In the case where a sufficient corrosion resistance is desired to be secured, a stainless steel (12%≤Cr) is used in a mold. Examples thereof include expensive steels such as SUS420J2 and SUS630. However, such a high corrosion resistance as in the Cr content of 12% or more is not necessary in many cases. Use of stainless steel involves high cost in excessive corrosion resistance.

Accordingly, the Cr content is insufficient in 5% but is excessive in 12% or more. There is an 8-17% Cr steel having a high C content to obtain a high hardness. However, such a steel contains a very large amount of carbides and has an adverse effect that mirror polishability and impact value are deteriorated. Furthermore, a stainless steel having a high C content consumes Cr as a carbide. Therefore, corrosion resistance is not as high as expected from the Cr content.

(Regarding Impact Value)

A mold is also required to be not broken during injection molding. The reason for this is to avoid the suspension of manufacturing due to replacement of a broken mold and the increase in production cost due to production of a new mold. The higher the impact value is, the lower the risk of breakage of a mold during injection molding. In this viewpoint, impact value of a mold is intended to be increased through optimization of steel material components and quenching method. In the case where the impact value (U notch, notch bottom radius of 1 mm, and height beneath the notch of 8 mm) at room temperature (21 to 27° C.) is 50 J/cm$^2$ or more, the risk of breakage of a mold during injection molding is greatly decreased. However, molds for injection molding have an impact value of 10 to 80 J/cm$^2$ at 38 HRC in many cases. Therefore, sufficient and stable decrease in the risk of breakage has not been achieved. Here, the impact value used herein is a value obtained by dividing an absorption energy [J] by a cross-sectional area [0.8 cm$^2$] of a test piece.

As described above, a steel for a mold having a good mirror polishability, intermediate corrosion resistance between a 5% Cr steel and a 12% Cr steel and a high impact value, has not been developed. For this reason, there has been a problem to inexpensively obtain a mold that can be beautifully polished on its surface, is hardly rust even in the storage during non-use period and is difficult to be broken during use.

Patent Literature 1 below discloses that in a steel material for a mold, alloy components are balanced so as to modify an oxide causing generation of pinholes and decrease its size, and polishing properties and machinability are improved. However, the component compositions in Examples described in Patent Literature 1, which substantiate the above, are low in C and high in Al as compared with the steel for a mold of the present invention, and differ from the present invention.

Patent Literature 1: JP-A-2004-91840

SUMMARY

The present invention has been made in view of the above circumstances as a background, and has an object to provide: a steel for a mold having a good mirror polishability and intermediate corrosion resistance between a 5% Cr steel and a 12% Cr steel after thermally refined to a given hardness, and further achieving a high impact value; and a mold.

One Aspect of c

In the steel for a mold, the following components can be contained as unavoidable impurities in the following ranges:
P≤0.10, S≤0.008, Cu≤0.30, W≤0.30, O≤0.05, Co≤0.30, Nb≤0.004, Ta≤0.004, Ti≤0.004, Zr≤0.004, B≤0.0001, Ca≤0.0005, Se≤0.03, Te≤0.005, Bi≤0.01, Pb≤0.03, Mg≤0.02, REM≤0.10, and the like.

The steel for a mold preferably further contains, in mass %, 0.30<Cu≤1.50.

The steel for a mold preferably further contains, in mass %, at least one kind of 0.30<W≤4.00 and 0.30<Co≤3.00.

The steel for a mold preferably further contains, in mass %, at least one kind of 0.004<Nb≤0.200, 0.004<Ta≤0.200, 0.004<Ti≤0.200, and 0.004<Zr≤0.200.

The steel for a mold preferably further contains, in mass %, 0.0001<B≤0.0050.

The steel for a mold preferably further contains, in mass %, at least one kind of 0.008<S≤0.050, 0.0005<Ca≤0.2000, 0.03<Se≤0.50, 0.005<Te≤0.100, 0.01<Bi≤0.50, and 0.03<Pb≤0.50.

Another aspect of the present invention relates to a mold, formed of the above-mentioned steel for a mold and having a hardness of 32 to 44 HRC.

In the present invention, the "mold" encompasses not only a mold body but also mold parts to be assembled to the mold body and used, such as pins. Furthermore, a mold which is formed of the steel of the present invention and has been subjected to a surface treatment or emboss processing is also encompassed.

As a result of investigations of the influence of steel components affecting mirror polishability, corrosion resistance and impact value in order to solve the above-described problems, the present inventor has found that desired properties can be obtained by the adjustment of C—Si—Mn—Ni—Cr—Mo—V—Al—N. The present invention has been made in view of this finding, and has the characteristics in that corrosion resistance is effectively enhanced by extremely reducing C and containing about 7 to 8% of Cr, and an Al content is limited to a specific range (0.007 to 0.150%) in view of a finding of the importance of the Al content, in particular, in high level stabilization of an impact value. The steel for a mold according to the present invention has a good mirror polishability and intermediate corrosion resistance between a 5% Cr steel and a 12% Cr steel after thermally refined to a given hardness, and further can achieve a high impact value. Furthermore, it is inexpensive as compared with conventional steels used in a mold for resin molding requiring mirror polishability.

Furthermore, according to the mold of the present invention, which is formed of the steel of the present invention and has a hardness adjusted to 32 to 44 HRC, processing of cutting and polishing become possible in a pre-hardened state after a quenching-tempering treatment and as a result, simplification of manufacturing process can be realized. Furthermore, when using the mold, the occurrence of abrasion and breakage at the time of resin molding is suppressed, and the life of a mold can be enhanced. On the other hand, even in the case where a mold is left for a certain period of time, a metal surface is difficult to rust. Therefore, re-polishing that has been conducted in the case of a mold formed of a low-Cr steel can be abolished or reduced.

The steel for a mold and the mold of the present invention as described above are suitable for use in injection molding or blow molding of resins (plastics or vinyls), molding or processing of rubbers, molding or processing of carbon fiber-reinforced plastics, and the like.

EMBODIMENTS

Figure 1A:
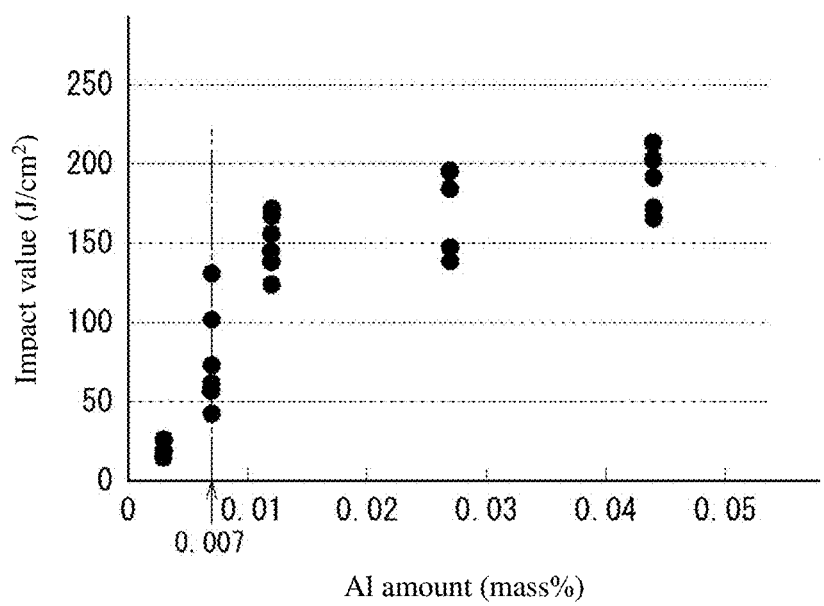
FIG. 1A is a graph showing the relationship between an Al content and an impact value (horizontal axis is a range in which the Al content is 0 to 0.05 mass %).

The reason for limiting each chemical component in the present invention is described below. The value of each chemical component is mass %.

0.045≤C≤0.090:

One of the characteristics of the present invention is that the range of the C content is limited to very narrow in order to balance various properties. In the case of C<0.045, insoluble carbides at the time of quenching is decreased and crystal grains are easily coarsened. In the case where a tempering temperature is high or in the case of being applied to additive manufacturing of a powder, 32 HRC or more is difficult to obtain. In the case of C<0.045, delta ferrite precipitates, which adversely affects mirror polishability and impact value. In addition, martensitic transformation point increases and coarse quenched microstructure is formed. As a result, impact value is decreased.

On the other hand, in the case of 0.090<C, weldability is deteriorated. In addition, thermal conductivity is greatly decreased. Tempering temperature dependency of hardness becomes apparent, and tempering hardness is difficult to adjust. Furthermore, carbides are increased, which adversely affects mirror polishability.

0.01≤Si≤0.50:

In the case of Si<0.01, machinability at the time of machine processing is remarkably deteriorated. In the case where an insoluble carbide at the time of quenching is VC, its amount decreases and crystal grains are easily coarsened. In the case where a tempering temperature is high, 32HRC or more is difficult to stably obtain.

On the other hand, in the case of 0.50<Si, thermal conductivity is greatly decreased. Delta ferrite precipitates, which adversely affects mirror polishability and impact value.

A preferable range of Si is 0.05≤Si≤0.46 and more preferably 0.10≤Si≤0.42.

0.10≤Mn≤0.60:

In the case of Mn<0.10, hardenability becomes insufficient, which causes insufficiency in hardness due to incorporation of ferrite. Furthermore, the insufficiency in hardenability causes a decrease in toughness due to incorporation of bainite. Martensitic transformation point is increased and coarse quenched microstructure is formed, which leads to a decrease in an impact value. In particular, an impact value at room temperature or lower is decreased.

On the other hand, in the case of 0.60<Mn, annealability is considerably deteriorated, and a heat treatment for softening is complicated and requires long time, which leads to an increase in manufacturing costs. Furthermore, thermal conductivity is greatly decreased. In the case where a tempering temperature is high, an impact value at room temperature is decreased (which is remarkable in the case where Si and P are high).

A preferable range of Mn is 0.15≤Mn≤0.55 and more preferably 0.20≤Mn≤0.50.

0.80≤Ni≤1.10:

In the case of Ni<0.80, hardenability becomes insufficient, which causes insufficiency in hardness due to incorporation of ferrite. Furthermore, the insufficiency in hardenability causes a decrease in toughness due to incorporation of bainite. Martensitic transformation point is increased and coarse quenched microstructure is formed, which leads to a decrease in an impact value. In particular, an impact value at room temperature or lower is decreased. The effect of increasing hardness due to a precipitation of a compound with Al is small.

On the other hand, in the case of 1.10<Ni, annealability is considerably deteriorated, and a heat treatment for softening is complicated and requires long time, which leads to an increase in manufacturing costs. Thermal conductivity is greatly decreased. Furthermore, costs are greatly increased.

A preferable range of Ni is 0.84≤Ni≤1.08 and more preferably 0.88≤Ni≤1.06.

6.60≤Cr≤8.60:

In the case of Cr<6.60, a secondary hardened amount becomes insufficient, and 32 HRC or more is difficult to obtain stably. A high temperature strength is decreased. Hardenability becomes insufficient, which causes a decrease in toughness due to incorporation of bainite. Martensitic transformation point is increased and coarse quenched microstructure is formed, which leads to a decrease in an impact value. Corrosion resistance is deteriorated and thus, a mold is easy to rust when being left. Furthermore, water-cooling hole inside the mold remarkably rusts, which leads to a breakage therefrom.

On the other hand, in the case of 8.60<Cr, thermal conductivity is greatly decreased. Tempering temperature dependency of hardness becomes apparent, and tempering hardness is difficult to adjust. Delta ferrite precipitates, which adversely affects mirror polishability and impact value.

A preferable range of Cr is 7.20≤Cr≤8.40 and more preferably 7.80≤Cr≤8.20.

0.01≤Mo≤0.70:

In the case of Mo<0.01, hardenability becomes insufficient. As a result, ferrite precipitates, which adversely affects mirror polishability and impact value. Contribution of secondary hardening is small, and in the case where a tempering temperature is high, 32 HRC or more is difficult to obtain stably. A high temperature strength becomes insufficient. The effect of improving corrosion resistance is poor.

On the other hand, in the case of 0.70<Mo, annealability is considerably deteriorated, and a heat treatment for softening is complicated and requires long time, which leads to an increase in manufacturing costs. Furthermore, fracture toughness is deteriorated, and a mold is easy to break. Furthermore, costs of raw materials are remarkably increased.

A preferable range of Mo is 0.10≤Mo≤0.65 and more preferably 0.20≤Mo≤0.60.

0.001≤V≤0.200:

In the case of V<0.001, the amount of a nitride and a carbide is decreased. As a result, the effect of suppressing crystal grains from coarsening during quenching is poor, which leads to a decrease in an impact value due to coarsening of grains. Contribution of secondary hardening is small, and in the case where a tempering temperature is high, 32 HRC or more is difficult to obtain stably.

On the other hand, in the case of 0.200<V, since the C content is not sufficient to bond to a large amount of V, excessive addition provides no practical benefit and merely leads to an increase in costs. In the case where the C content is close to the upper limit described above, a coarse nitride and carbonitride are increased and serve as a starting point of cracks, which leads to a decrease in an impact value.

A preferable range of V is 0.008≤V≤0.180 and more preferably 0.015≤V≤0.150.

0.007≤Al≤0.150:

One of the characteristics of the present invention is that the range of the Al content is limited to narrow. The biggest reason of avoiding Al<0.007 is for stabilization of an impact value at a high level. In the case where the Al content is too small, the impact value is remarkably decreased. Furthermore, AlN is decreased, and as a result, the effect of suppressing crystal grains from coarsening during quenching is poor, which leads to a decrease in an impact value due to coarsening of grains.

On the other hand, in the case of 0.150<Al, AlN is excessively increased and is coarsened. As a result, starting points of fracture are increased, and the impact value becomes less than 50 J/cm$^2$. Furthermore, large foreign substances, which will drop off when mirror polishing, are increased and pinholes are easy to be generated. Furthermore, thermal conductivity is greatly decreased.

A preferable range of Al is 0.050<Al≤0.150 and more preferably 0.050<Al≤0.120.

It has conventionally been considered that a steel for a mold, which is used in injection molding or blow molding of resins (plastics or vinyls), molding or processing of rubbers, molding or processing of carbon fiber-reinforced plastics, and the like, is better to have a smaller content of Al. The reason for this is that in the case where the Al content is excessively large, an oxide and nitride are formed in a large amount, which leads to a decrease in mirror polishability and an impact value. However, in the steel of the present invention having a special component system, unique phenomenon that an impact value is remarkably decreased in the case where the Al content is small, is developed. In the present invention, the Al content is limited to a narrow range based on this finding.

Figure 1B:
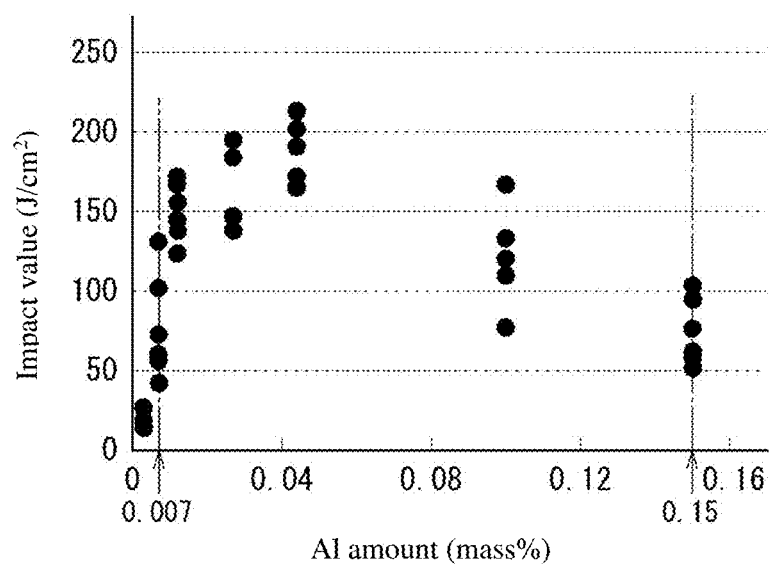
FIG. 1B is a graph showing the relationship between an Al content and an impact value (horizontal axis is a range in which the Al content is 0 to 0.16 mass %).

FIG. 1A and FIG. 1B show the influence of the Al content affecting an impact value at 24° C. (U notch, notch bottom radius: 1 mm, and height beneath the notch of 8 mm). A steel of 0.060C-0.30Si—0.35Mn-0.95Ni-7.95Cr-0.45Mo-0.10V-0.012N was used as a basic component, and the Al content was varied. These steels were quenched from 870° C. and tempered, to thermally refine to 36.5 HRC. As shown in FIG. 1A, in the case of Al=0.003, the impact value is very low as 14 to 27 J/cm$^2$. In the case of Al=0.07, although there is a conspicuous scattering, 50 J/cm$^2$ is almost secured. Furthermore, in the case where Al is excessively large, an impact value turns to decrease due to the increase in inclusions as shown in FIG. 1B. From the data, 0.007≤Al≤0.150 was set as the range of the present invention. Furthermore, in the case of 0.050<Al≤0.150, the impact value can be stably 50 J/cm$^2$ or more.

Figure 2:
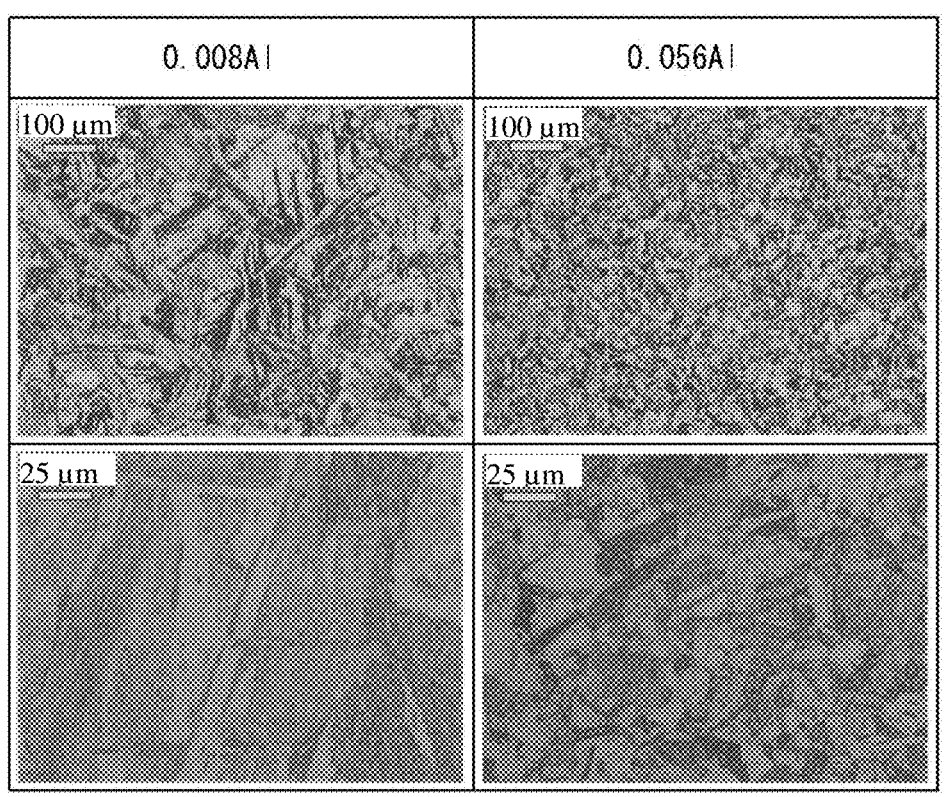
FIG. 2 is a photomicrograph showing a structure of a steel material in the case where the Al content was varied.

FIG. 2 is an image of a microphotograph showing a structure of a steel material in the case where the Al content was varied. A steel of 0.063C-0.29Si-0.31Mn-0.96Ni-7.98Cr-0.45Mo-0.088V-0.0274N was used as a basic component, and the Al content was varied. These steels were quenched from 870° C. and tempered, to thermally refine to 36.5 HRC. As shown in the image, in the case of Al=0.056, it is understood that crystal grains are finer than those in the case of Al=0.008. In the case where the crystal grains are fine, a smooth surface can be obtained by mirror polishing.

In other words, the preferred range of Al considering an impact value and mirror polishability is $0.050<Al≤0.150$.

$0.0002≤N≤0.0500$:

In the case of N<0.0002, AlN is decreased. As a result, the effect of suppressing crystal grains from coarsening during quenching is poor, which leads to a decrease in an impact value due to coarsening of grains.

In the case of 0.0500<N, the time and cost of refining required for N addition are increased, which leads to an increase in a material cost. A coarse AlN is increased and serves as a starting point of cracks, which leads to a decrease in an impact value. Furthermore, the coarse AlN also deteriorates mirror polishability.

A preferable range of N is $0.0010≤N≤0.0400$ and more preferably $0.002≤N≤0.0300$.

$0.30<Cu≤1.50$:

The steel of the present invention that is a low C steel also has a small amount of carbides that suppress migration of crystal grain boundary and thus, crystal grains are easy to coarsen during quenching. Therefore, it is effective to prevent coarsening of grains during quenching by adding Cu that has an excellent solute drag effect. The steel of the present invention is slightly short in hardenability in the case where Mn—Ni—Cr is small, but Cu also has an effect of enhancing hardenability. Furthermore, the present invention also has small amounts of elements contributing to secondary hardening, such as C—Mo—V, and therefore, tempering hardness does not become extremely high. However, the tempering hardness can be considerably increased by utilizing the precipitation hardening of Cu.

On the other hand, excessively large content of Cu involves the problems of an increase in costs and breakage during hot working.

The steel of the present invention, which has small amounts of Mo and V as a tool steel, has not so high high-temperature strength. Selective addition of W and Co is effective to secure a high-temperature strength. W increases strength through precipitation of a carbide and solid solution. Co increases strength through solid solution into a matrix, and simultaneously contributes to precipitation hardening through the change of a carbide form. Furthermore, these elements also have an effect of suppressing austenite crystal grains from growing during quenching due to a solute drag effect. Specifically, at least one kind (one element) of:

$0.30<W≤4.00$, and $0.30<Co≤3.00$ may be contained.

Each element exceeding the predetermined amount brings about saturation of properties and remarkable cost increase.

Selective addition of Nb—Ta—Ti—Zr is also effective to suppress austenite crystal grains from growing during quenching. Carbides, nitrides and carbonitrides formed by bonding to these elements suppress migration of crystal grain boundary. Specifically, at least one kind of:

$0.004<Nb≤0.200$, $0.004<Ta≤0.200$, $0.004<Ti≤0.200$, and $0.004<Zr≤0.200$ may be contained.

Each element exceeding the predetermined amount brings about excessive formation of carbides, nitrides and oxides, and those serve as fracture starting points of a mold.

B has an effect of improving hardenability and grain boundary strengthening. As a result, the impact value is stabilized at a high level. Specifically, $0.0001<B≤0.0050$ may be contained.

In the case where B added forms BN, the original purpose of the addition of B is not achieved. Therefore, B can be prevented from bonding to N by fixing N by forming a nitride with an element having an affinity with N stronger than that of B. Examples of such an element include Nb, Ta, Ti, and Zr. These elements have the effect of fixing N even though they are present in an impurity level.

The addition of B also is helpful to improve machinability. In the case of improving machinability, BN may be formed. BN has properties similar to graphite, decreases cutting resistance and simultaneously improves chip crushability. B, a compound of Fe and B, BN, and the like may co-exist in a steel. In this case, hardenability, impact value, machinability, and the like are improved depending on the state of B existing in the steel.

Selective addition of S—Ca—Se—Te—Bi—Pb is also effective to improve machinability. Specifically, at least one kind of:

$0.008<S≤0.050$, $0.0005<Ca≤0.2000$, $0.03<Se≤0.50$, $0.005<Te≤0.100$, $0.01<Bi≤0.50$, and $0.03<Pb≤0.50$ may be contained.

Each element exceeding the predetermined amount brings about remarkable decreases in hot workability and an impact value.

According to the present invention as described above, a steel for a mold having a good mirror polishability and intermediate corrosion resistance between a 5% Cr steel and a 12% Cr steel after thermally refined to a predetermined hardness and further having a high impact value, and a mold can be provided. The mold of the present invention is formed of the steel for a mold of the present invention, and has a hardness of 32 to 44 HRC.

EXAMPLES

Tests for evaluating mirror polishability, corrosion resistance and impact value were conducted on Invention Steels and Comparison Steels (total 22 steels) shown in Table 1.

Comparison Steel 1 is a commercially available product, and is a steel for a mold, generally used in injection molding and blow molding of resins (plastics and vinyls). Comparison Steel 2 is JIS SKD61 that is a 5Cr-die steel. Comparison Steel 3 is JIS SUS420J2 that is a high strength stainless steel. Comparison Steel 4 is a high strength stainless steel and is known as JIS SUS630. These Comparison Steels fall outside the scope of the present invention in at least four major elements.

TABLE 1

| | | Chemical Composition (mass %, balance Fe) | | | | | | | | | |
|---|---|---|---|---|---|---|---|---|---|---|---|
| | | C | Si | Mn | Ni | Cr | Mo | V | Al | N | Others |
| Invention Steel | 1 | 0.061 | 0.31 | 0.32 | 0.94 | 7.99 | 0.44 | 0.090 | 0.032 | 0.0082 | |
| | 2 | 0.045 | 0.10 | 0.50 | 1.06 | 7.80 | 0.20 | 0.015 | 0.012 | 0.0300 | |
| | 3 | 0.090 | 0.42 | 0.20 | 0.88 | 8.20 | 0.60 | 0.150 | 0.100 | 0.0020 | |
| | 4 | 0.053 | 0.05 | 0.55 | 1.08 | 7.20 | 0.10 | 0.008 | 0.009 | 0.0400 | |
| | 5 | 0.075 | 0.46 | 0.15 | 0.84 | 8.40 | 0.65 | 0.180 | 0.120 | 0.0010 | |
| | 6 | 0.056 | 0.11 | 0.49 | 1.05 | 7.81 | 0.21 | 0.016 | 0.013 | 0.0021 | 0.58Cu |
| | 7 | 0.058 | 0.41 | 0.21 | 0.89 | 8.19 | 0.59 | 0.149 | 0.099 | 0.0299 | 3.07W |
| | 8 | 0.060 | 0.21 | 0.30 | 0.95 | 7.90 | 0.30 | 0.049 | 0.034 | 0.0062 | 1.98Co |
| | 9 | 0.062 | 0.31 | 0.39 | 1.00 | 8.00 | 0.40 | 0.080 | 0.055 | 0.0148 | 0.04Nb |
| | 10 | 0.064 | 0.16 | 0.44 | 0.93 | 8.10 | 0.50 | 0.111 | 0.077 | 0.0243 | 0.03Zr |
| | 11 | 0.070 | 0.26 | 0.35 | 1.08 | 7.95 | 0.26 | 0.133 | 0.044 | 0.0097 | 0.003Ti, 0.0011B |
| | 12 | 0.051 | 0.36 | 0.26 | 0.97 | 8.05 | 0.02 | 0.003 | 0.065 | 0.0201 | 0.048S |
| | 13 | 0.061 | 0.31 | 0.32 | 0.94 | 7.99 | 0.44 | 0.090 | 0.052 | 0.0082 | |
| | 14 | 0.045 | 0.10 | 0.50 | 1.06 | 7.80 | 0.20 | 0.015 | 0.062 | 0.0300 | |
| | 15 | 0.053 | 0.05 | 0.55 | 1.08 | 7.20 | 0.10 | 0.008 | 0.069 | 0.0400 | |
| | 16 | 0.056 | 0.11 | 0.49 | 1.05 | 7.81 | 0.21 | 0.016 | 0.083 | 0.0021 | 0.58Cu |
| | 17 | 0.060 | 0.21 | 0.30 | 0.95 | 7.90 | 0.30 | 0.049 | 0.094 | 0.0062 | 1.98Co |
| | 18 | 0.070 | 0.26 | 0.35 | 1.08 | 7.95 | 0.26 | 0.133 | 0.108 | 0.0097 | 0.03Ti, 0.0011B |
| Comparison Steel | 1 | 0.124 | 0.31 | 1.51 | 3.31 | 0.21 | 0.30 | 0.001 | 1.012 | 0.0028 | 1.04Cu |
| | 2 | 0.388 | 1.02 | 0.44 | 0.08 | 5.11 | 1.18 | 0.913 | 0.024 | 0.0197 | |
| | 3 | 0.340 | 0.72 | 0.68 | 0.24 | 12.26 | 0.06 | 0.196 | 0.034 | 0.0114 | |
| | 4 | 0.043 | 0.66 | 0.71 | 3.89 | 16.52 | 0.01 | 0.001 | 0.013 | 0.0083 | 3.96Cu, 0.28Nb |

Each of 22 steels shown in Table 1 was cast into 150 kg-ingot to prepare a steel ingot. The steel ingot was subjected to a homogenization treatment at 1,240° C. for 24 hours, and then the steel ingot was formed into a bar shape having a rectangular cross-section of 60 mm×45 mm by hot forging, and this steel bar was cooled to 100° C. or lower. Subsequently, the steel bar was heated to 1,020° C. and then cooled to 100° C. or lower to conduct normalizing. The steel bar was further subjected to tempering. The tempering conditions are maintaining at 600° C. for 12 hours for Comparison Steel 1 and Comparison Steel 4 are and maintaining at 680° C. for 8 hours for the other steels. Various test pieces were prepared from these tempered materials.

<Evaluation of Mirror Polishability>

A plate of 51 mm×31 mm×101 mm was cut out of the tempered material, and subjected to a quenching-tempering treatment in vacuo to thermally refine to 36 to 38 HRC. The quenching temperature is 870° C. for 18 Invention Steels and Comparison Steel 1, 1,030° C. for Comparison Steel 2 and Comparison Steel 3, and 1,050° C. for Comparison Steel 4. After maintaining at each quenching temperature for 1 hour, quenching was conducted by cooling with nitrogen gas of 6 bar. As the tempering, a treatment of maintaining at 500 to 650° C. for 3 hours was conducted several times.

The plate after tempering was formed into a size of 50 mm×30 mm×100 mm by grinding, to have a surface roughness of a face of 50 mm×100 mm being ▽▽▽G.

As the evaluation of mirror polishability, the face of 50 mm×100 mm was polished by raising the count of abrasives, and finally mirror polished with the count of #8000. The polished face was visually observed, and the presence or absence of pinholes was evaluated according to the following criteria.

The case in which there is no pinhole due to drop-out of foreign substances (carbides, oxides and nitrides) was evaluated as "S"; the case in which there are 1 or 2 pinholes was evaluated as "A"; and the case in which there are 3 or more pinholes was evaluated as "B".

The results of evaluation were that 18 Invention Steels, Comparison Steel 1 and Comparison Steel 4 were "S", Comparison Steel 2 was "A", and Comparison Steel 3 was "B". The reason that the number of pinholes in Comparison Steel 3 is larger than that in Comparison Steel 2 is that the amount of coarse Cr type carbide and alumina ($Al_2O_3$) is large.

It could be confirmed from the above that mirror polishability of Invention Steels is equivalent to that of Comparison Steel 1 that has been generally used in a mold for injection molding and blow molding of resins (plastics and vinyls). Invention Steels have very excellent mirror polishability. Furthermore, market evaluation that pinholes are easy to be generated in Comparison Steel 2 and Comparison Steel 3 was supported by this experiment.

<Evaluation of Corrosion Resistance>

A plate of 41 mm×26 mm×13 mm was cut out of the tempered material, and subjected to quenching-tempering in vacuo to thermally refine to 36 to 38 HRC. The quenching-tempering conditions are the same as in the test pieces of mirror polishability. The plate after tempering was formed into a size of 40 mm×25 mm×12 mm by grinding, and all of six faces was polished to finish a mirror state.

Corrosion resistance was evaluated by a humidity cabinet test. The mirror polished test piece was left to stand in the environment of temperature: 50° C. and humidity: 98%, and generation state of rust was compared and evaluated according to the following criteria.

The case in which there is no rusted place was evaluated as "S"; the case in which there are 1 to 3 rusted places was evaluated as "A"; the case in which there are 4 to 10 rusted places was evaluated as "B"; and the case in which there are more than 10 rusted places was evaluated as "C".

The results of corrosion resistance were that Comparison Steel 4 was "S", 18 Invention Steels and Comparison Steel 3 were "A", Comparison Steel 2 was "B", and Comparison Steel 1 was "C". Invention Steels do not come up to the 17% Cr stainless steel of low C (Comparison Steel 4), but are equivalent to the 12% Cr stainless steel of high C (Comparison Steel 3). In addition, Invention Steels are superior to the 5% Cr-die steel (Comparison Steel 2). From the above, it could be confirmed that the corrosion resistance of Invention Steel is located between a 5% Cr steel and a 12% Cr steel and is considerably close to stainless steel.

<Evaluation of Impact Value>

A square bar of 11 mm×11 mm×55 mm was cut out of the tempered material, and subjected to quenching-tempering in vacuo to thermally refine to 36 to 38 HRC. The quenching-tempering conditions are the same as in the test pieces of mirror polishability. An impact test piece of 10 mm×10 mm×55 mm was cut out of the square bar after tempering. The notch shape is U shape having a notch bottom radius of 1 mm and a height beneath the notch of 8 mm. The test was conducted at room temperature (21 to 27° C.). The absorption energy was divided by the cross-sectional area of 0.8 $cm^2$ to obtain an impact value, which was evaluated by the following criteria.

The case in which the impact value exceeds 100 $J/cm^2$ was evaluated as "S"; the case in which the impact value exceeds 50 $J/cm^2$ and is 100 $J/cm^2$ or less was evaluated as "A"; and the case in which the impact value is 50 $J/cm^2$ or less was evaluated as "B".

The results of the impact value were that 18 Invention Steels were "S", Comparison Steel 2 and Comparison Steel 4 were "A", and Comparison Steel 1 and Comparison Steel 3 were "B". Comparison Steel 1 is such a type that an intermetallic compound between Ni and Al precipitates, and is brittle. Comparative Steel 3 contains a large amount of coarse carbides and therefore has a low impact value.

It could be confirmed from the above that the impact value of Invention Steels is further higher than that of Comparison Steel 1 that has been generally used in a mold for injection molding and blow molding of resins (plastics and vinyls).

<Summary of Properties>

The results obtained are collectively shown in Table 2 below. As for the cost shown in Table 2, Comparison Steel 1 that has been generally used in a mold for injection molding and blow molding of resins (plastics and vinyls) was taken as a standard "A"; the case of cheaper than that was evaluated as "S"; and the case of more expensive than Comparison Steel 1 was evaluated as "B".

TABLE 2

|  |  | Mirror polishability | Corrosion resistance | Impact property | Cost |
|---|---|---|---|---|---|
| Invention Steel | 1 | S | A | S | S |
|  | 2 | S | A | S | S |
|  | 3 | S | A | S | S |
|  | 4 | S | A | S | S |
|  | 5 | S | A | S | S |
|  | 6 | S | A | S | S |
|  | 7 | S | A | S | S |
|  | 8 | S | A | S | S |
|  | 9 | S | A | S | S |
|  | 10 | S | A | S | S |
|  | 11 | S | A | S | S |
|  | 12 | S | A | S | S |
|  | 13 | S | A | S | S |
|  | 14 | S | A | S | S |
|  | 15 | S | A | S | S |
|  | 16 | S | A | S | S |
|  | 17 | S | A | S | S |
|  | 18 | S | A | S | S |
| Comparison Steel | 1 | S | C | B | A |
|  | 2 | A | B | A | S |
|  | 3 | B | A | B | S |
|  | 4 | S | S | A | B |

As shown in Table 2, the evaluation results of Invention Steels are "S" and "A" and do not show "B" or less. On the other hand, the evaluation results of Comparison Steels include "B" and "C". It was confirmed from the above that Invention Steels have an excellent mirror polishing, high corrosion resistance and high impact value. Furthermore, it is understood that Invention Steels suppress the addition amount of expensive elements such as Cu, Ni and Al to be low, and can realize the above-described excellent properties without increasing the cost.

Examples of the present invention are described in detail above, but these are merely one exemplification. For example, the steel and mold of the present invention are effective to be used in combination with a surface modification treatment such as shot peening, nitridation treatment, PVD treatment, CVD treatment, PCVD treatment, plating treatment, and DLC coating treatment. Adding an emboss processing that provides specific patterns (concavity and convexity) on the surface of the mold (including parts) of the present invention by machine processing or corrosion is also effective as a method of enhancing an added-value of the present invention. The steel of the present invention can be formed in a bar shape or a wire shape and used as a welding repair material of a mold and parts. Additionally, the steel of the present invention can be formed into a plate or a powder, and a mold and parts can be produced by additive manufacturing thereof. As such, the present invention can be carried out in an embodiment having various modifications added thereto in a scope without departing from its gist.

This application is based on Japanese Patent Application No. 2018-193634 filed on Oct. 12, 2018 and Japanese Patent Application No. 2019-155011 filed on Aug. 27, 2019, the contents of which are incorporated herein by reference.

What is claimed is:

1. A steel having a composition comprising, in mass %:
0.045≤Ca≤0.090,
0.01≤Si≤0.50,
0.10≤Mn≤0.60,
0.80≤Ni≤1.10,
6.60≤Cr≤8.60,
0.01≤Mo≤0.70,
0.001≤V≤0.200,
0.050≤Al≤0.094, and
0.0002≤N≤0.0500,
with the balance being Fe and unavoidable impurities, and having an impact value exceeding 50 J/cm2, wherein the steel has a hardness 32 HRC to 44 HRC.

2. The steel according to claim 1, further comprising, in mass %:
0.30<Cu≤1.50.

3. The steel according to claim 1, further comprising, in mass %, at least one kind of:
0.30<W≤4.00 and
0.30<Co≤3.00.

4. The steel according to claim 2, further comprising, in mass %, at least one kind of:
0.30<W≤4.00 and
0.30<Co≤3.00.

5. The steel according to claim 1, further comprising, in mass % at least one kind of:
0.004<Nb≤0.200,
0.004<Ta≤0.200,
0.004<Ti≤0.200, and
0.004<Zr≤0.200.

6. The steel according to claim 2, further comprising, in mass %, at least one kind of:
0.004<Nb≤0.200,
0.004<Ta≤0.200,
0.004<Ti≤0.200, and
0.004<Zr≤0.200.

7. The steel according to claim 3, further comprising, in mass %, at least one kind of:
0.004<Nb≤0.200,
0.004<Ta≤0.200,
0.004<Ti≤0.200, and
0.004<Zr≤0.200.

8. The steel according to claim 4, further comprising, in mass %, at least one kind of:
0.004<Nb≤0.200,
0.004<Ta≤0.200,
0.004<Ti≤0.200, and
0.004<Zr≤0.200.

9. The steel according to claim 1, further comprising, in mass %:
0.0001<B≤0.0050.

10. The steel according to claim 2, further comprising, in mass %:
0.0001<B≤0.0050.

11. The steel according to claim 3, further comprising, in mass %:
0.0001<B≤0.0050.

12. The steel according to claim 4, further comprising, in mass %:
0.0001<B≤0.0050.

13. The steel according to claim 5, further comprising, in mass %:
0.0001<B≤0.0050.

14. The steel according to claim 6, further comprising, in mass %:
0.0001<B≤0.0050.

15. The steel according to claim 7, further comprising, in mass %:
0.0001<B≤0.0050.

16. The steel according to claim 8, further comprising, in mass %:
0.0001<B≤0.0050.

17. The steel according to claim 1, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

18. The steel according to claim 2, further comprising, in mass %, at least one kind of:
0.008<S≤0.050,
0.0005<Cas≤0.2000,
0.03<Se≤0.50,
0.005<Te≤0.100,
0.01<Bi≤0.50, and
0.03<Pb≤0.50.

19. The steel according to claim 3, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

20. The steel according to claim 4, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

21. The steel according to claim 5, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

22. The steel according to claim 6, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

23. The steel according to claim 7, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

24. The steel according to claim 8, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

25. The steel according to claim 9, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

26. The steel according to claim 10, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

27. The steel according to claim 11, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

28. The steel according to claim 12, further comprising, in mass %, at least one kind of:
0.008<S≤0.050,
0.0005<Ca≤0.2000,
0.03<Se≤0.50,
0.005<Te≤0.100,
0.01<Bi≤0.50, and
0.03<Pb≤0.50.

29. The steel according to claim 13, further comprising, in mass %, at least one kind of:
- $0.008 < S \leq 0.050$,
- $0.0005 < Ca \leq 0.2000$,
- $0.03 < Se \leq 0.50$,
- $0.005 < Te \leq 0.100$,
- $0.01 < Bi \leq 0.50$, and
- $0.03 < Pb \leq 0.50$.

30. The steel according to claim 14, further comprising, in mass %, at least one kind of:
- $0.008 < S \leq 0.050$,
- $0.0005 < Ca \leq 0.2000$,
- $0.03 < Se \leq 0.50$,
- $0.005 < Te \leq 0.100$,
- $0.01 < Bi \leq 0.50$, and
- $0.03 < Pb \leq 0.50$.

31. The steel according to claim 15, further comprising, in mass %, at least one kind of:
- $0.008 < S \leq 0.050$,
- $0.0005 < Ca \leq 0.2000$,
- $0.03 < Se \leq 0.50$,
- $0.005 < Te \leq 0.100$,
- $0.01 < Bi \leq 0.50$, and
- $0.03 < Pb \leq 0.50$.

32. The steel according to claim 16, further comprising, in mass %, at least one kind of:
- $0.008 < S \leq 0.050$,
- $0.0005 < Ca \leq 0.2000$,
- $0.03 < Se \leq 0.50$,
- $0.005 < Te \leq 0.100$,
- $0.01 < Bi \leq 0.50$, and
- $0.03 < Pb \leq 0.50$.

* * * * *